United States Patent [11] 3,610,550

[72] Inventor Horace Brock
Brookville Road, Jericho, N.Y. 11753
[21] Appl. No. 859,901
[22] Filed Sept. 22, 1969
[45] Patented Oct. 5, 1971

[54] TAPE RECORDERS
8 Claims, 7 Drawing Figs.

[52] U.S. Cl. .......... 242/198, 242/67.4, 242/210
[51] Int. Cl. .......... G11b 23/10, G11b 15/18
[50] Field of Search .......... 242/197, 201, 198, 210, 199, 200, 71.1, 71.2, 74, 67.3, 67.4, 57

[56] References Cited

UNITED STATES PATENTS

| | | | |
|---|---|---|---|
| 2,213,768 | 9/1940 | Merriman et al. | 242/198 |
| 2,981,492 | 4/1961 | Simjian | 242/67.3 R |
| 3,348,786 | 10/1967 | Miller et al. | 242/200 |
| 3,495,787 | 2/1970 | Wallace | 242/74.1 X |

*Primary Examiner*—George F. Mautz
*Attorney*—Allison C. Collard

ABSTRACT: Improvements to portable tape recorders which permit them to be leased to groups of persons in public places of interest for listening to prerecorded educational information. The components of the recorder are maintained in a locked case so as to prevent the recorded program from being removed or rewound while the machine is in use. External battery terminals also permit the recorder to be easily recharged while protecting the batteries from accidental short circuits across the external terminals.

FIG. 1
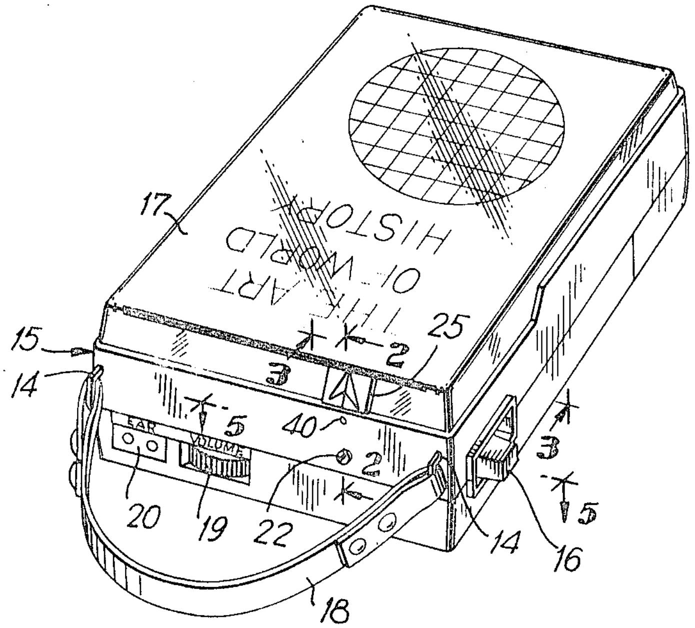
FIG. 2
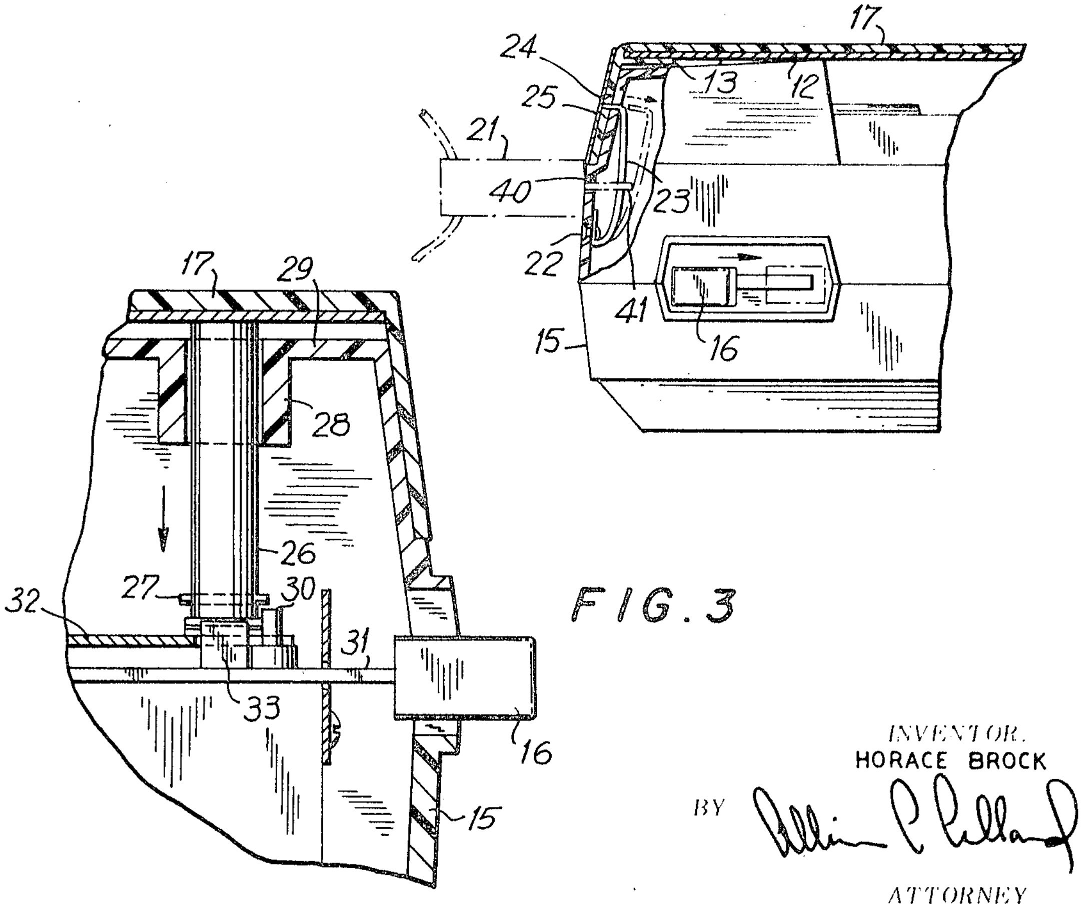
FIG. 2, FIG. 3
INVENTOR.
HORACE BROCK
BY
ATTORNEY

INVENTOR.
HORACE BROCK

BY

ATTORNEY

INVENTOR
HORACE BROCK
BY [signature]
ATTORNEY

TAPE RECORDERS

This invention relates improvements to portable tape recorders for the purpose of adapting these recorders as instructional units to be carried by individuals throughout places of interest.

More specifically, this invention relates to improvements to portable tape recorders which prevent the user of the recorder from gaining access inside its case, and tampering with its program.

Portable tape recorders are presently being utilized as educational aids for instructing and lecturing to persons or large groups in public places of interest such as museums, aquariums, zoos and the like. In these places of interest, the tape recorders are programmed with a lecture so that the user can travel to different portions of the place of interest and receive continuous or intermittent educational instruction. For example, in an art museum, the program will consist of factual information concerning each of the paintings which are on display in a particular featured program. These portable tape recorders are leased for short intervals of time to the user and generally include a 15–30 minute program which can be played as desired by the user. If conventional portable tape recorders were to be utilized by the public in these places of interest, it would be possible for the user to rewind the program as often as desired during the tour. This would significantly tie up the use of the recorders and thus reduce its earning capacity during the lease period.

Conventional portable tape recorders adapted for public use also suffer from a disadvantage in that their cases are not tamperproof so that its tape program and batteries could be easily removed or stolen by the user while the recorder is being leased. Moreover, these conventional recorders generally do not provide any space on the machines for advertising the instruction program to the user, or for directions or maps of the tour.

Accordingly, the present invention overcomes many of the above-described disadvantages of conventional portable tape recorders in providing a tamperproof instrument case constructed in part from the original portable tape recorder case and slightly modified at little expense. The improvements further include a few additional inexpensive components which readily adapt the recorder for public use. In cartridge-type tape recorders, the cover on the case of the recorder is hinged over the tape cartridge. In this invention, the cover of the recorder is replaced with a transparent cover which is disposed completely over one entire side of the machine and permits advertising literature or directions and instructions to be easily inserted and removed from the inside surface of the cover. A latch is also provided on the inside of the machine to maintain the cover in a closed and locked position to prevent the user from tampering with the cartridge of the machine. The latch can only be released by inserting a special tool through the sidewall of the recorder and cannot be released by the user with the aid of any conventional devices customarily found upon the person of the user at any given time. The cover also depresses a cylindrically shaped button slidably mounted inside the recorder which blocks the function switch from being depressed so as to prevent the taped program from being rewound. Likewise, when the cover is opened by service personnel at the end of each use, the button, which is spring loaded, pushes the cover open and releases the function switch so that the taped program may be wound rapidly if necessary to the end of the tape so as to be in position to start the next use at the beginning.

The improved recorder of the invention also utilizes rechargeable batteries which have an electrical capacity to permit the recorder to sustain its operation throughout an entire day of use, and still be fully recharged overnight. The battery compartment of the recorder, which has been sealed against removal, also provides a pair of external contacts which can be easily connected to corresponding contacts of a battery charger. The external contacts of the recorder are also isolated from accidental short circuits which may occur across these contacts by providing a semiconductor diode in series connection to the batteries within the recorder.

The improved recorder of the invention which has been modified for public use in places of interest also requires no internal loudspeaker since the recorder is designed to power earphones for private listening enjoyment. Since no loudspeaker is contained within the recorder, the case of the recorder can remain substantially sealed except for its function switch, volume control, and earplug terminals. This sealed enclosure also prevents dust and other contaminates from entering the unit during its repeated use.

It is therefore an object according to the present invention to provide an improved tape recorder having a substantially sealed and tamperproof case, for public use as an educational and instructional aid in places of interest.

It is another object according to the present invention to provide an improved portable tape recorder which consists of a modified conventional recorder, adapted for public use.

It is still a further object according to the present invention to provide an improved portable tape recorder which is simple in design, inexpensive to modify, and reliable in operation.

Other objects and features of the present invention will become apparent from the following detailed description, considered in connection with the accompanying drawings which disclose several embodiments of the invention. It is to be understood, however, that the drawings are designed for the purpose of illustration only and not as a definition of the limits of the invention.

In the drawings wherein similar reference characters denote similar elements throughout the several views:

FIG. 1 is a perspective view of the improved tape recorder of the invention;

FIG. 2 is a cross-sectional view taken through section 2—2 of FIG. 1;

FIG. 3 is a further cross-sectional view taken through section 3—3 of FIG. 1;

Figures 4, 5:
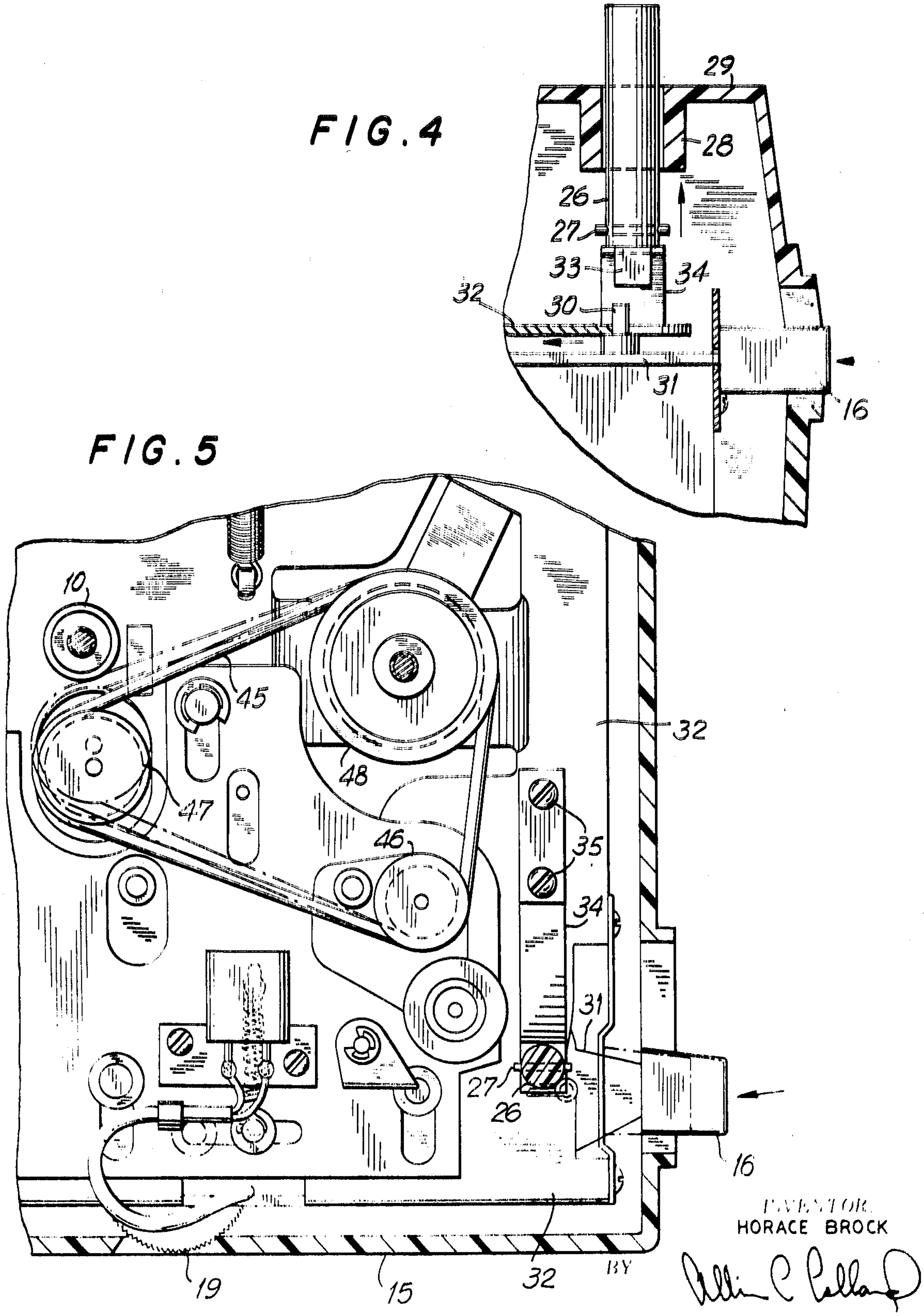
FIG. 4 is a further cross-sectional view similar to that shown in FIG. 3, with the cover of the recorder in its open position.
FIG. 5 is a cross-sectional view of the mechanism of the recorder taken along section 5—5 of FIG. 1.
Figure 6A:
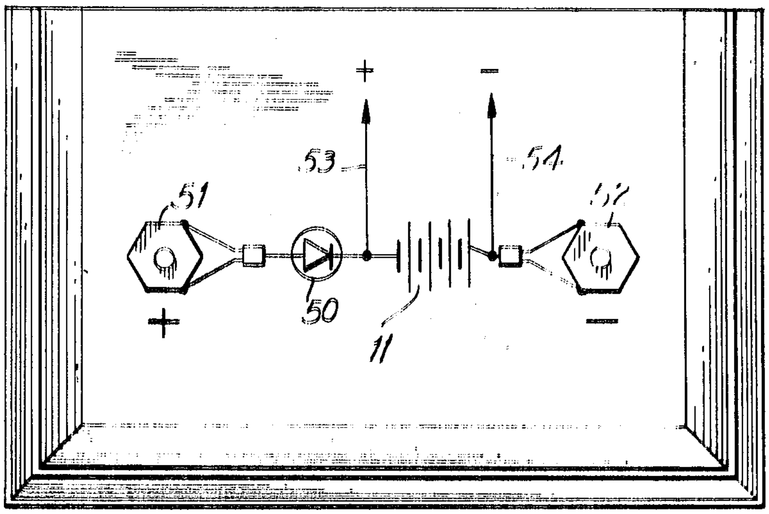
FIGS. 6*a* and 6*b* are detailed views of the battery compartment of the improved recorder.
Figure 6B:
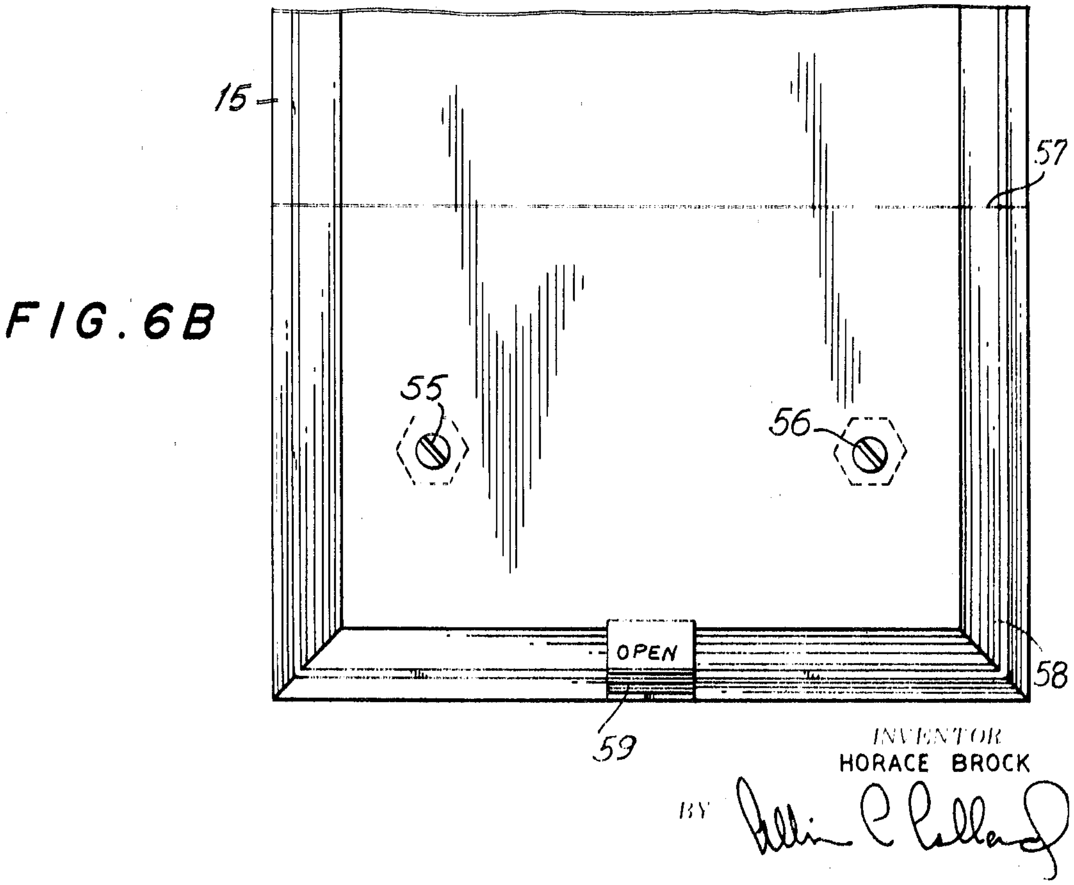

Referring to FIGS. 1 and 2, there is shown the improved recorder 15 of the subject invention consisting of a modified conventional recorder having an on-off function switch 16 which is adapted for sliding movement along the longitudinal dimension of the case in the direction of the arrows shown. Recorder 15 also includes a hand or shoulder strap 18 which may be adjusted to any particular length to suit the purpose of the user. Strap 18 is secured on the end of the case by means of brackets 14. The top portion of recorder 15 includes an integrally formed cover 17 constructed from a transparent material such as clear plastic, and has a slot formed by flange 13 at one end adapted to receive a flat printed program 12 which is displayed through the transparent top surface of the cover. The printed material 12 can be used to advertise the particular program which has been prerecorded on the cartridge contained within the recorder, or for directions or maps of a tour. The cartridge (not shown) is only accessible when cover 17 is opened in order to prevent the user of recorder 15 from tampering or removing the cartridge. Cover 17 is provided with an internal latch 23, which engages a slot 24 formed along the sidewall of cover 17. Slot 24 is covered on its external surface by plate 25 bonded or cemented to the side of cover 17. The bottom end of latch 23 is secured to the case of recorder 15 by means of fastening bolt 22. Disposed in the vicinity of the center of latch 23 is a small hole 40 within the case of the recorder which permits maintenance personnel to insert an opening tool 21 having a small diameter projecting rod 41 which is capable of passing through hole 40 and engaging latch 23. By pushing against the body of latch 23, it can be moved into its position as shown in dotted line so that its top, horizontal portion releases from slot 24 to permit the cover 17 to be opened.

Referring now to FIGS. 3, 4, and 5, there are shown detailed cross-sectional views which relate to a cartridge rewind locking mechanism. The locking mechanism includes a cylindrical button 26 which is slidably disposed through cylindrical opening 28 on internal surface 29 inside the recorder. Function switch 16 which was previously described for turning the recorder on and off, is also utilized when pushed inward, as shown in the arrows of FIGS. 4 and 5, for rewinding the tape cartridge. As shown in detail in FIG. 5, elastic drive belt 45, which is driven by capstan pulley 46, is coupled to rewind pulley 47, and takeup pulley 48. When function switch 16 is depressed inward as shown in its dotted line position in FIG. 5, plate 31 and its associated linkages which are coupled to rewind pulley 47 move inward to advance pulley 47 and its moving belt 45 against the surface of supply spindle 10, which is coupled to one of the reels of the tape cartridge. This inward movement of function switch 16 thus causes the tape cartridge to be rewound. Mounted on the moving plate 31 connected to function switch 16 is an upstanding bolt 30 which is disposed underneath cylindrical button 26. Cylindrical button 26 normally rests upon a flat metal leaf spring 34 whose end is bent vertically downward to intercept bolt 30. The other end of lead spring 34 is secured by means of fasteners 35 to tape deck 32.

When cover 17 of the apparatus is opened, pushbutton 17 will be lifted upward by means of the spring action of leaf spring 34 so that its vertical end portion 33 is not engaged to bolt 30. However, when cover 17 is closed pushing down on the top of button 26 as shown in FIG. 3, vertical end portion 33 will be depressed in front of bolt 30 and prevent switch 16 from being depressed inward in order to rewind the tape cartridge. Leaf spring 34 also serves to spring load button 26 so that when cover latch 23 is disengaged from cover 17, cover 17 will pop open due to the pressure of leaf spring 34.

Referring to FIGS. *6a* and *6b*, there is shown still a further embodiment of the invention wherein rechargeable batteries 11 are connected on their negative terminal to terminal 52, and through their positive terminal in series connection with diode 50 to terminal 51. Terminals 51 and 52 consist of nuts threadably engaged to conductive screws 55 and 56 which are mounted through the outside of the battery compartment 58. Terminals 51 and 52 may also consist of small contacts instead of conductive screws or nuts which are mounted through the outside of compartment 58. Battery compartment 58, which can normally be opened by applying pressure to finger grip 59 has been sealed to the body of recorder 15 by means of conventional adhesives. Screws 55 and 56 which now serve as recharging terminals and have been brought out on the external surface of battery compartment 58 can be easily connected to any conventional charging source. Diode 50 serves to isolate the positive and negative terminals 53 and 54 of battery 11 from the presence of short circuits which may accidentally cross external terminals 55 and 56.

In addition to the above -described improvements and modifications to this recorder, the improved recorder or tape player has further been modified by the removal of any recording or microphone connections, internal speaker, and recording level meters so that the only openings appearing on the external surfaces of the case are function switch 16, volume control 19, and earplug connector 20. The absence of further openings to the mechanism within the case and the fact that rechargeable batteries 11 need not be removed from the case for recharging, assures a long life and contamination free operation of recorder 15.

While only a few embodiments of the present invention have been shown and described, it will be understood that many changes and modifications may be made thereunto without departing from the spirit and scope of the invention.

What is claimed is:

1. In a portable tape player contained in a case having a cover disposed on its top portion over a tape and having a rewind switch linkage responsive to an external slide function switch for causing the tape to be rewound and including a prerecorded message on the tape and rechargeable batteries for supplying power to the player for use as an educational aid and instruction apparatus, the improvement comprising;
   - an internal latch for securing the cover of the player over the prerecorded tape including a flexible substantially U-shaped metal member affixed at one end thereof to the case of the tape player and slidably movable at the opposite end thereof into a slot provided in the cover of the case;
   - a movable button on the case having one end for contact with the cover; and
   - spring blocking means engaging the other end of said button for moving and holding said button in an elevated position when the cover is opened, said spring means being depressed by said button to engage and block the rewind switch linkage of the player when the cover is closed.

2. The tape player as recited in claim 1 further comprising a release pin for insertion through an opening in the case of the tape player and engagement with said latch for disengaging said latch from the cover to open the player.

3. The tape player as recited in claim 1, wherein said spring blocking means comprises, a leaf spring secured to the case having an extending portion on its free end, and a vertical bolt secured on said rewind linkage for engagement with the free end of said leaf spring so that when the slide switch is actuated, the lateral displacement of the slide switch linkage is limited to prevent rewinding of the tape.

4. The tape player as recited in claim 1 wherein said player additionally comprises external terminal means disposed on the case of the player and electrically connected to the rechargeable batteries.

5. The tape player as recited in claim 4 wherein said external terminal means comprises a pair of screws secured through the case and electrically coupled to the rechargeable batteries.

6. The tape player as recited in claim 4 additionally comprising an isolation diode electrically connected in series with one of said external terminals so as to isolate said terminals from said batteries during an electrical short circuit thereacross.

7. The tape player as recited in claim 1 wherein the battery compartment of the case is adhesively secured to the case.

8. The tape player as recited in claim 1 wherein the cover of the player is transparent, and additionally comprises means for receiving advertising literature, instructions, maps and the like, for display on the inside surface of the cover.